United States Patent [19]

Baas

[11] 3,964,520

[45] June 22, 1976

[54] CONNECTION BETWEEN TWO INTER ENGAGING ELEMENTS

[75] Inventor: Hendrik Bernhard Baas, Vreeland, Netherlands

[73] Assignee: Verenigde Machinefabrieken N.V., The Hague, Netherlands

[22] Filed: June 19, 1974

[21] Appl. No.: 480,878

[30] Foreign Application Priority Data
June 20, 1973 Netherlands ...................... 7308591

[52] U.S. Cl. .................................. 138/89; 285/222; 285/286; 285/330; 285/DIG. 2; 285/DIG. 16; 292/256.73
[51] Int. Cl.² ..................... F16L 55/10; F16L 41/00
[58] Field of Search ........... 285/222, 328, 330, 286, 285/DIG. 2, DIG. 16, 302, 189; 292/256.73; 138/89

[56] References Cited
UNITED STATES PATENTS

| 1,542,266 | 6/1925 | Palmer et al. ....................... 285/330 |
| 1,678,946 | 7/1928 | Joyce ............................ 285/DIG. 2 |
| 2,165,621 | 7/1939 | Donahue et al. ................... 285/222 |
| 3,771,817 | 11/1973 | Schnubel ....................... 285/DIG. 2 |
| 3,787,945 | 1/1974 | Pusek ................................. 285/222 |

FOREIGN PATENTS OR APPLICATIONS 1,229,932  12/1966  Germany ............................. 285/330

Primary Examiner—Dave W. Arola
Attorney, Agent, or Firm—Haseltine, Lake & Waters

[57] ABSTRACT

A connection between the end of a cylindrical pipe inserted into a hole in a plate for connection there with, the connection being fluid-tight and capable of resisting a torsional couple; the connection is effected by first expanding the pipe-end with respect to the original pipe profile and by shaping the cross-section of the outer circumference of the expanded pipe-end and the inner wall of the hole in the plate such that the projection of the zone of contact upon a plane perpendicular to the axis of the pipe differs from a pure circular form.

10 Claims, 4 Drawing Figures

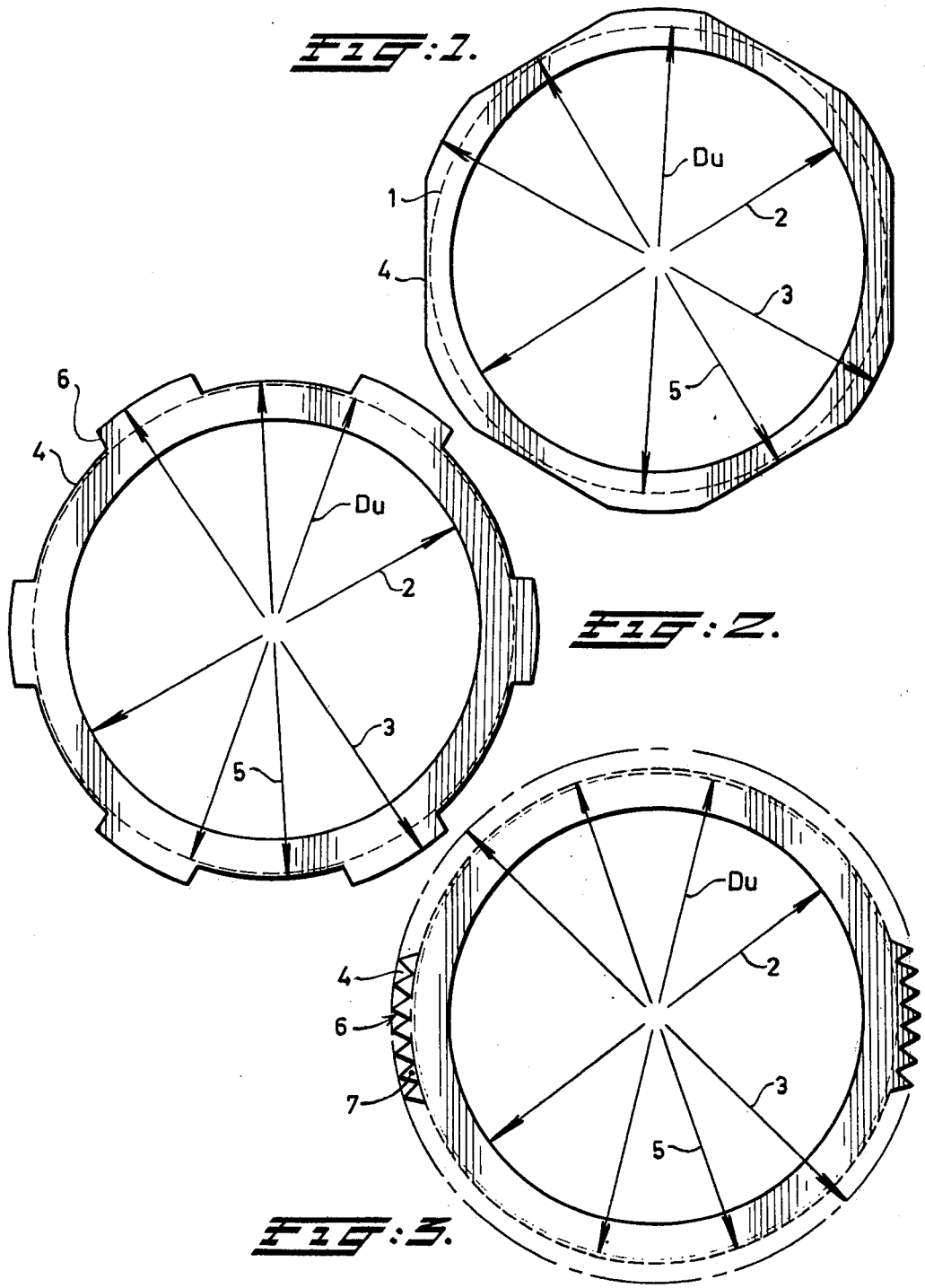

CONNECTION BETWEEN TWO INTER ENGAGING ELEMENTS

BACKGROUND OF THE INVENTION

My invention relates to a connection between two inter engaging elements, such as between a cylindrical pipe and a plate, in which an extremity of the pipe is inserted into a hole of the plate and is secured therein.

My invention relates in particular to those connections, in which there is also the danger that under specific circumstances great forces are applied to the pipe, resulting into a torsional couple which is applied to the connection between the pipe and the plate. These forces can, for instance, be caused by an explosion of a rotating apparatus, in which parts of said apparatus enter into contact with the pipe. The plate can be flat, but sometimes forms part of a vessel in which a great number of pipes are mounted at a relatively short distance from one another. A connection as mentioned above, is commonly effected by welding or glueing.

DISCUSSION OF THE PRIOR ART

In the present case however, there are a number of problems. In the first place, the inner side of the vessel is difficult to reach, so that the welding or glueing operation can take place from one side only. Commonly one applies the method called recess-welding. The disadvantage of recess-welding is that the weld does not extend over the entire thickness of the plate. This does not contribute to the strength.

In the second place, there is the danger that the plate will deform due to the welding. In the third place there will often occur a fissure during welding. The notch-action caused by such a fissure, makes it impossible for such a weld can take up the above-mentioned torsional couple.

There also is used explosion-welding. To this end, an explosive charge is positioned in that portion of the pipe which is inserted in the plate. After the ignition of the explosive charge, the shock-wave which then occurs, will press the pipe-wall so strongly against the innerside of the hole in the pipe-plate, that a weld is generated.

The region within the pipe, where the pressure increase occurs, can however, not be sharply delimited. Consequently a pressure rise will also occur along a certain length of the pipe adjacent to the pipe plate. In that region, the pipe is however no longer supported. Consequently a bulging of the pipe occurs at this location, whereby crack-formation can even take place. This danger is specifically present when the pipewall is thin.

When the connection between the pipe and the pipe plate is insufficiently strong, a rupture of the pipe connection can occur when a torsional couple is applied. With an overpressure inside the pipe, the contents of the pipe may stream out. With an underpressure in the pipe, air or other fluid can enter into the pipe. Both situations are undesired and can even be dangerous, as for instance poisonous gases may escape, such that a risk to life occurs. On the other hand, for instance, air can penetrate into a vacuum-installation as a consequence of which damage can occur in this installation.

SUMMARY OF THE INVENTION

My invention seeks to produce a connection between the pipe and the pipe plate which is as strong as possible, without incurring the above-mentioned drawbacks. This aim is realized to in that the pipe end which is inserted into the plate has been expanded with respect to the original pipe profile, and in that the projection of the zone of contact between the pipe-end and the plate upon a plane perpendicular to the axis of the pipe differs from the pure circular form. The exterior profile of the pipe-end, i.e. the portion of the pipe along a length at least equal to the distance over which the pipe enters into the plate, will be completely adapted to the shape of the hole in the plate, such that both parts interengage with a certain fit. The connection between the pipe and the plate is realized by inserting the pipe into the hole of the plate, after which the outer side of the pipe is welded or glued to the plate. Due to the fact that the cross-section of the pipe and the hole are not round, the connection can transmit a torsional couple by means of pressure forces between the pipewall and the wall of the hole.

The welding connection serves to provide a gastight connection and to secure the pipe in axial direction. It is therefore sufficient to apply a light weld, in consequence of which there is no, or considerably less danger of deformation.

As the weld need not transfer forces, notch-action is no longer relevant and it is of no importance that the welding operation can only take place from one side.

The profile for the section of the hole in the plate will be preferably chosen such that the circle with a centre on the axis of the pipe and lying in a plane perpendicular to this axis and internally touching that portion of the profile of the hole with the smallest radial distance, has a diameter which is equal to or not substantially greater than the outer diameter of the undeformed pipe. In this manner it is prevented that the pipe is weakened over a distance along which the special profile of the outer circumference of the pipe is present.

When the pipe must be sealed at one end, this can be realized by means of a flange. This flange can be secured by means of bolts. The part of the apparatus, which after explosion can come into contact with the pipewall, may however, also enter into contact with the flange. Consequently, this flange is subjected to forces resulting in a rotational couple, a horizontal force or a vertical force.

Consequently, my invention also relates to a connection between two inter-engaging elements, such as between a closure lid positioned upon a pipe-end and a ring mounted around this lid and the pipe-end. According to my invention, a strong connection is obtained when the projection of the zone of contact between the lid and the ring upon a plane parallel to the lid differs from a pure circular form.

According to a favourable embodiment of my invention, the circumference of the lid can have the same profile as the outer circumference of the pipe. According to this embodiment, it is also useful for the pipe to protrude over a certain length through the plate. Subsequently, a ring can be pushed over the pipe-end and the lid, said ring having at its inner side the same profile as the pipe.

In this manner it is possible with such an embodiment to transmit with the lid a rotational couple as well as horizontal forces through the pipe to the plate. The vertical forces upon the lid can be taken up by a toggle or a dog.

The profile of the hole or the ring is chosen preferably such that the circle lying in a plane perpendicular to the axis of the pipe or the lid, with a center upon this axis, and externally touching that part of the profile of the hole or the lid with the greatest radial distance, has a diameter which is as reduced as possible. In this manner, the hole will not take up too much room.

Preferably, the profile of the hole is chosen such that a part of the common zone of contact between the pipe-end or the lid and the plate or the ring is formed by linear segments, cutting the circle circumference at an angle greater than 0° and as closely as possible to 90°. In this manner the arm of the couple applied by the pressure forces with respect to the center of the pipe or of the lid is as great as possible. In combination with the great wall surface, a considerable torsional couple can be resisted by small pressure forces.

SURVEY OF THE DRAWING

FIGS. 1 – 3 are cross-sections through different pipe-ends.

DESCRIPTION OF PREFERRED EMBODIMENTS

Figure 4:
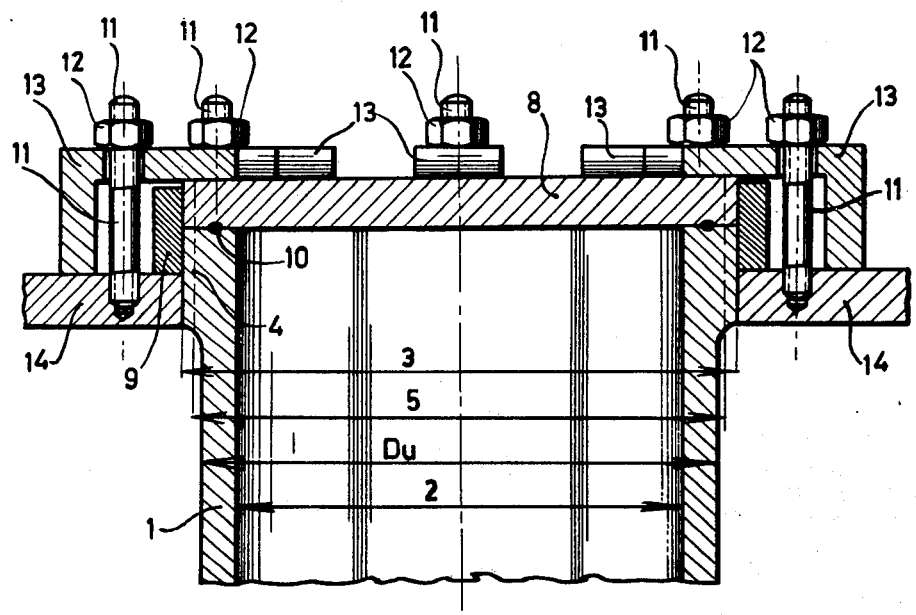
FIG. 4 is a axial section through a lid connection.

FIG. 1 shows an embodiment in which the enlarged profile of the outer circumference of a pipe reaching into a hole of a pipe plate, has the shape of a hexagon. The pipe 1 with an internal diameter 2 has locally a greater outer diameter 3. At this greater outer diameter flat faces 4 are provided, in consequence of which the profile of the outer circumference locally differs from the pure circular form. The diameter 5 is preferably equal to or greater than the normal outer diameter Du of the pipe, which is smaller than the diameter 3. Expressed in mathematical terms:

$$5 \geq Du < (3) \qquad (1)$$

FIG. 2 shows an embodiment in which the profile of the outer circumference of the pipe inserted in the hole of the pipe plate is shaped with key-slots. The pipe 1 with inner diameter 2 has locally a greater outer diameter 3. In this greater outer diameter grooves 4 are formed, such that the profile of the outer circumference differs locally from the pure circular form. The flanks 6 extend perpendicular to the circle circumference and transmit a torsional couple. The distance 5 is preferably equal to, or greater than the normal outer diameter Du of the pipe, which is smaller than 3. The formula I here also applies.

FIG. 3 shows an embodiment in which the profile of the outer circumference of the pipe extending in the hole of the pipe plate has a toothing or is milled (crenelated). The pipe 1 with the inner diameter 2 has locally a greater outer diameter 3. Upon this greater outer diameter, grooves 4 are formed such that teeth 7 occur, causing the profile of the outer circumference to differ locally from the pure circular form. The flanks 6 of the teeth 7 enclose an angle with the circle circumference and transmit the torsional couple. The diameter 5 is preferable equal to or greater than the normal outer diameter Du of the pipe, which is smaller than 3. Here also the formula I applies.

FIG. 4 is an example of an application, in which the profile of the pipe is used for transmitting a rotational couple applied on a lid, to the pipewall, and from there towards the plate. The pipe 1 with inner diameter 2 has locally a greater outer diameter 3. On this portion with greater outer diameter, a profile is provided according to one of those shown in FIGS. 1 to 3. The circle described inside this profile and contacting this profile has an inner diameter 5.

Upon the pipe 1 a lid 8 is mounted, which through a ring 9 is capable of transmitting a rotational couple and a force perpendicular to the axis of the pipe upon the pipe wall 1. The pipe wall itself can transmit this couple or this force further to the plate 14. The innerside of the ring 9 has the same profile as the outerside of the lid 8 and the outerside of the expanded portion of the pipe 1. The sealing between the parts 1 and 9 can, for instance, be obtained by means of a glue-connection between these parts.

Between the lid 8 and the pipe wall 1 a sealing ring 10 is mounted for rendering the connection fluid-tight. The lid 8 is secured by means of a toggle 13 which in turn is pressed by means of a stud 11 with a nut 12.

What I claim is:

1. A fluid-tight connection between two interengaged elements comprising an elongated pipe element having an end, and a plate element with a hole receiving the end of the pipe element, said pipe element having a constant internal diameter, said end of the pipe element having a greater wall thickness and a greater outer diametral extent as compared to the remainder of the pipe element and having a non-circular shape in a plane perpendicular to the axis of the pipe element, said hole in the plate element being complementary in shape to the non-circular shape of the pipe end and receiving a first portion of said pipe end for transmitting torsional force therebetween, a lid on said pipe end to close the same, said lid having an outer surface of the same shape as the pipe end, a ring engaging both the lid and a second portion of the pipe end to transmit torsional force therebetween, and an annular seal between said lid and said pipe end and means holding said ring on said pipe end and holding said lid against said pipe end with said seal interposed therebetween to form a liquid-tight connector.

2. A connection as claimed in claim 1 comprising a weld between the pipe end and the plate element.

3. A connection as claimed in claim 1 comprising adhesive means between the pipe end and the plate element.

4. A connection as claimed in claim 1 wherein said non-circular shape of the pipe end is formed by respective first and second portions of greater and lesser radius from the axis of the pipe element, the radius of said second portion being at most not substantially greater than the radius of the remainder of the pipe element.

5. A connection as claimed in claim 1 wherein said non-circular shape includes linear segments which are radially inclined at an angle greater than 0°.

6. A connection as claimed in claim 5 wherein said linear segments extend radially.

7. A connection as claimed in claim 5 wherein said non-circular portion is of ziz-zag tooth shape.

8. A connection as claimed in claim 5 wherein said non-circular portion is of cylindrical shape with flats thereon.

9. A connection as claimed in claim 5 wherein said non-circular portion is of cylindrical shape with crenelated steps.

10. A connection as claimed in claim 1 wherein said plate element is relatively thin and said pipe end of greater wall thickness and outer diametral extent has a greater axial extent than the thickness of the plate element to project therebeyond.

* * * * *